Nov. 15, 1966  W. HUNTH  3,285,139
FLUID LINKAGE AND SERVO SYSTEM
Filed July 21, 1964  2 Sheets-Sheet 1
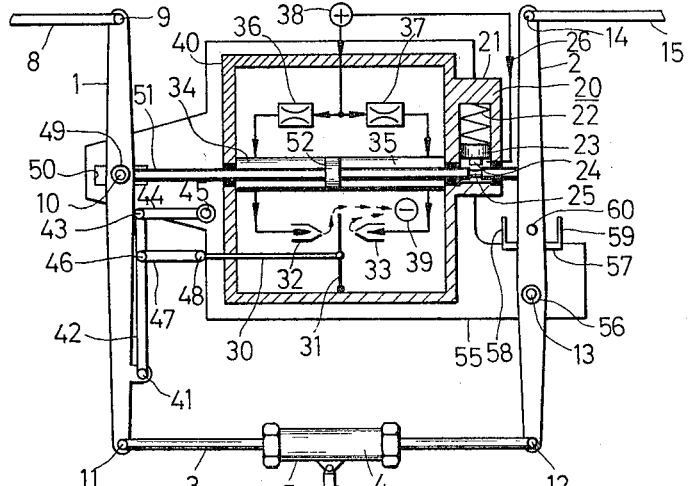
Fig. 1
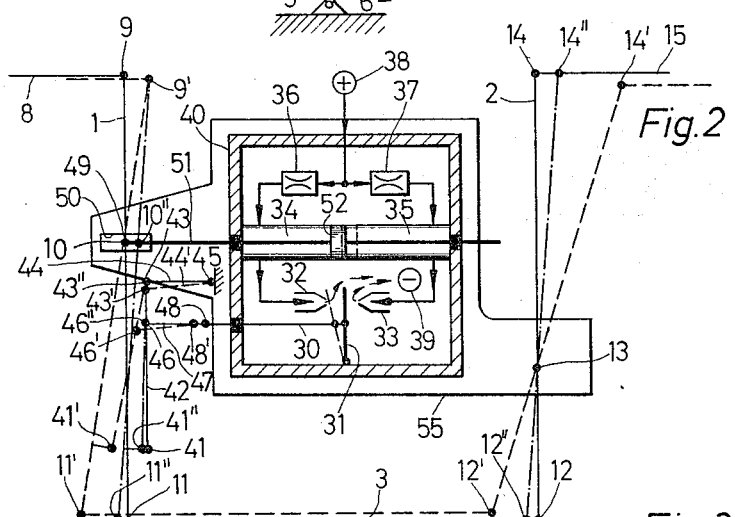
Fig. 2
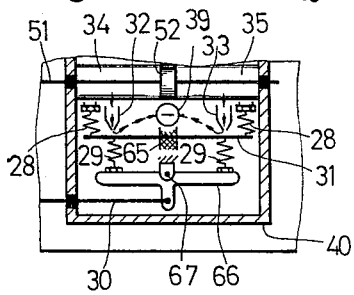
Fig. 5
Fig. 4
Fig. 3
INVENTOR
Werner Hunth
By McGlew and Toren
ATTORNEYS Nov. 15, 1966  W. HUNTH  3,285,139
FLUID LINKAGE AND SERVO SYSTEM
Filed July 21, 1964  2 Sheets-Sheet 2

INVENTOR
Werner Hunth

By  M. Glawand Toren
ATTORNEYS

United States Patent Office 3,285,139
Patented Nov. 15, 1966

3,285,139
FLUID LINKAGE AND SERVO SYSTEM
Werner Hunth, Munich, Germany, assignor to Bolkow Gesellschaft mit beschrankter Haftung, Ottobrunn, near Munich, Germany
Filed July 21, 1964, Ser. No. 384,141
Claims priority, application Germany, July 23, 1963, B 72,798
18 Claims. (Cl. 91—51)

This invention relates to aircraft controls and, more particularly, to a novel mechanical-hydraulic control aid for aircraft of the type controlled mainly according to the acceleration method, such as, for example, thrust jet controlled VTOL aircraft, and to a novel method of controlling such an aircraft.

In aircraft to which the control aid of the present invention is particularly applicable, such as VTOL airplanes, control of the aircraft, at least in the starting phase, or in the transition phase from hovering to vertical flight and vice versa, is effected in a known manner merely by varying the thrust of a jet propulsion unit. At such times these aircraft behave like inert masses on which practically no air forces are acting. The thrust variations correspond to a so-called "pure acceleration control" with such short reaction times that a pilot cannot manually, without additional aids, control such an aircraft, in the above-mentioned flying phases, about more than one axis.

For example, in order to be able to control the aircraft directly as a function of the acceleration, the pilot thereof would have to have sufficient skill capable of increasing a control pulse briefly and decreasing it immediately, by differentiation, to such an extent that the time curve of the control pulse on a thrust jet control device corresponds at least approximately to the course of the control pulse as set by the determinants of the VTOL airplane, for example. These control processes, as they become necessary for correcting gravity movements or position changes of a VTOL airplane, for example, and particularly when the phenomena appear simultaneously in multi-axial superposition, place the pilot under a safety jeopardizing stress. Furthermore, the reaction, even of a skilled pilot, is usually too slow to compensate, in time and with sufficient safety, by counter control pulses, any troubles caused by engine irregularities or squalls. As a result it is impractical for an aircraft of this type to be held in the desired flight position by manual control by the pilot and without the help of control aids.

Consequently, it has been necessary to use flight regulators of various types in VTOL airplanes. These flight regulators comprise electronic-hydraulic means for translating input values of control pulses into corresponding acceleration-dependent output values. Such control pulses may be fed over pulses transmitters, or may be initiated by the pilot through a mechanical actuating element, in dependence on the velocity or position of the aircraft. Furthermore, so-called "hovering flight regulators" are known, and these hold a VTOL airplane automatically in its instantaneous flight position by controlling it with respect to its six degrees of freedom.

Known flight regulators essentially comprise an electronic unit and a hydraulic unit. The electronic unit translates input values into electric output values having an output amplitude or power coordinated with the input requirements of a hydraulic servo valve. The hydraulic unit amplifies the output value of the electronic unit to an extent sufficient to exert the necessary displacement force on a control device or control devices of the thrust jet controlled VTOL aircraft.

In the present state of the art, meeting the desired or necessary control criteria requires a relatively complicated design of a flight regulator. Thus, existing safety requirements, particularly for VTOL airplanes, can be satisfied only to a limited extent by available means. This is due to the fact that the reliability and life of known flight regulators, and particularly of the electronic units thereof, leave much to be desired. As is well known, the failure of a flight regulator in a VTOL airplane can cause the crash of the airplane within a few seconds.

As a corrective measure, the so-called "fail-safe" principle is used in electronic equipment for airplanes so that, upon failure of an electronic control unit or failure in a control chain, the unit or the chain is immediately substituted by a second reserve unit or control chain. Control systems, in which the control chains are provided in duplicate or triplicate, with automatic recognition and disconnection of a defective control chain, are known. Recently, it has been suggested that control systems be provided with four duplicate control chains. Naturally this greatly increases the expenditure for flight regulators, particularly as these work in all the axes of freedom of the airplane and in several channels. However, even such multiplicated control systems are not one hundred percent reliable, because they are effective only as long as an electrical power supply is available.

In accordance with the present invention, the foregoing problems of prior art flight regulators are advantageously obviated transforming the velocity-dependent control pulses into acceleration-dependent control pulses by means of a lever chain or linkage and a nozzle-baffle fluid pressure control or servo system so coupled to each other that, upon introduction of a control pulse, an input value proportional to the displacement of the lever chain is mechanically transformed into a higher value, and this higher value is fed back hydraulically, with a predetermined delay, to provide an output value which is proportional to the input value and which is smaller than the latter.

In general control engineering, it is known to use a spring-piston damper to increase a control pulse and then to feed it back. Such an arrangement, however, is not suitable for the control of VTOL airplanes because the proportioning effect is absent, so that the feed back, or decrease in the pulse value, proceeds substantially to a zero value. Constant interference factors, due to errors in the design of the airplane, due to parts out of trim because of weight disposition, or to any other cause, cannot be eliminated with known control devices. In addition when spring-piston dampers are connected in series with a control linkage, there is always present the danger that the control feeling on the control stick, or the "feel" of the control, is considerably impaired by the spring. Particularly in the case where a spring is used as a damping element, the time constants of the feed back cannot be maintained accurately because of the differing friction effects in the piston damper and in the masses of the control linkage.

Advantageously, in accordance with a preferred embodiment of the invention, the lever chain or linkage of the control aid or servo system comprises a first lever and a second lever which are interconnected by a rod articulated to both levers. The arm ratios of the two levers are so selected that a relatively small displacement of one end of the first lever, due to manual actuation by the pilot, results in a very substantial displacement of a control end of the second lever. A housing is provided for the hydraulic unit, and the second or output lever has a fixed fulcrum in this housing and serving as a reference point for the control aid. The coupling between the mechanical part of the control aid and the hydraulic part thereof is effected only through the first or input lever.

The hydraulic unit of the control aid includes a pair of nozzles operatively associated with a control baffle, and these nozzles control the effective position of a double acting piston disposed in a cylinder. The cylinder, on opposite sides of the piston, is connected to a common source of fluid under pressure through throttling means, and a common sink or return is provided for the discharge from the nozzles. In order to provide small displacement paths for the baffle in the nozzle-baffle control component, coupling of the mechanical part of the control aid with the hydraulic or fluid pressure unit of the control aid is advantageously effected by connecting the nozzle-baffle control component to the mechanical system unilaterally by means of a control rod pivoted to the baffle, an articulation link pivoted to the control rod, and a coupling rod pivotally connected to the articulation link and pivotally connected at one end to a crank having a fixed fulcrum in the housing. The other end of this coupling rod is pivotally connected to the longer arm of the first or input lever. The output side of the fluid pressure servo unit is coupled with the mechanical unit by pivotally connecting the piston rod of the control piston with the fulcrum of the first or input lever of the lever chain or linkage.

In accordance with the invention, the coupling of the mechanical unit of the control aid with the fluid pressure or servo unit thereof is so designed that, after the fluid pressure feed back has been completed, an output value is effective on the control device and is proportional to the input value of the control pulse and smaller than the latter. Without the provision of proportioning of the control pulse, which latter remains dependent upon the position of the control stick, thrust jet control either is not possible or is possible only to a limited extent, as is known to those skilled in the art.

The invention is further directed to advantageously novel designs of the coupling of the mechanical unit of the control aid, on the input side, with the hydraulic or fluid pressure servo unit of the control aid. Thus, a simplification of the coupling linkage on the input side, particularly with respect to the interconnections thereof, is advantageously achieved by arranging the baffle for guided displacement with respect to relatively fixed nozzles, and designing the baffle, or at least the operative parts thereof, in the form of an equal-legged acute-angled prism. The base of the prism extends in the direction of displacement of the baffle, and one nozzle is associated with each respective side face of the prism and is preferably directed perpendicularly toward the associated side face. By providing a suitable angle between the base and the sides of the prismatic baffle, the length of the baffle path necessary to provide an effective change in the output of the nozzles can be correspondingly increased so that the required mechanical speed reduction of the coupling linkage can be effected with a simple lever and link arrangement. Advantageously, the prismatic baffle is supported in a guiding means without play by means of initially stressed springs, and practically friction free by means of rolling bodies.

An additional advantageous simplification of the mechanical reduction transmission between the coupling linkage and the baffle can be provided by designing the baffle as a flexing spring which is clamped rigidly either at one end or at its center. If the displacement of the baffle in such an arrangement, by travel of the coupling linkage, exceeds the size of the gap initially existing between the baffle and its associated nozzle, such a flexible spring baffle can be deformed under the action of the coupling linkage and thus absorb the excess travel to the coupling linkage. In such an arrangement, relatively large overshooting input pulses thus can be absorbed simply and without impairment of the control system.

Preferably, the coupling of the invention comprises elastic intermediate members interposed between the baffle and the coupling rod and/or between the baffle and fixed points in the housing. The combination of the elastic intermediate members and the baffle act like series and/or parallel connected springs and thus operate in accordance with the principle of the so-called "comparison of forces." Advantageously, the nozzles associated with the baffle and/or at least a part of the elastic intermediate members are adjustable either individually or conjointly.

A control aid according to the invention will thus perform the necessary functions with simple mechanical and hydraulic means and without the necessity of an electronic unit. An advantage is that it can be arranged at practically any point of a control linkage normally used for engine control, and it is of no consequence whether the control linkage is electrically and/or mechanically coupled with the known automatic or semi-automatic flight regulator, or whether the control is used for control about one axis or about plural axes. The control aid of the invention has the further advantage that the zero point of the hydraulic unit can be adjusted by varying the throttling gap of the nozzles. The time constant of the hydraulic control unit can also be influenced in such a manner, or else by varying the pressure respectively the rate of flow of the pressure medium.

As a further advantageous feature of the control aid of the invention, a reaction lock is provided in the lever chain for completely or partially inhibiting reaction of control device forces on the lever chain, as described and illustrated in allowed U.S. patent application Serial No. 293,732 entitled, "Mechanical Airplane Control With Several Control Inputs Acting on a Common Vane," now U.S. Patent No. 3,228,632. The control linkage will thus assure translation of all control impulses originating from displacement of the control stick, to the control device, while inhibiting any reaction of the control device on the control stick and thus preventing any impairment of the "feel" of the control stick. In the exceptional case that the control aid is necessary to be used as an emergency control if the hydraulic system fails, a spring loaded lock for the control piston is effective in the center or neutral position thereof, and becomes automatically effective in case of hydraulic pressure failure in order to avoid so-called "dead control" movements.

Accordingly, an object of the invention is to provide a control aid by means of which the pilot can control a thrust jet controlled VTOL airplane manually in dependence on the speed, and about at least one axis of freedom of the airplane, in case of failure of the flight regulator or failure of an electric power supply.

Another object of the invention is to provide a control aid for translating velocity-dependent control pulses into acceleration-dependent control pulses by means of a known lever linkage and a known nozzle-baffle control system which are so coupled that, upon introduction of a control pulse, an input value proportional to the displacement of the lever chain is mechanically transformed into a higher value and this higher value is reduced hydraulically, with a predetermined delay, to an output value proportional to the input value and smaller than the latter.

A further object of the invention is to provide an improved nozzle-baffle fluid pressure servo control system.

Yet another object of the invention is to provide an improved coupling arrangement between a nozzle-baffle fluid pressure control hydraulic system and a mechanical system, whose operation or displacement is assisted by the hydraulic system.

Still another object of the invention is to provide a control aid for a VTOL airplane involving a lever chain and a fluid pressure servo control system, and having simplified and improved interconnections between the lever chain and the control system.

A still further object of the invention is to provide a nozzle-baffle control system in which the baffle is in the form of a prism which is displaceable in a direction parallel to its base and in which each side of the prism has a respective nozzle associated therewith and oriented substantially perpendicularly thereto.

Still another object of the invention is to provide a combination of a mechanical linkage and a nozzle-baffle fluid pressure control system in which component parts are adjustable either individually or conjointly.

Another object of the invention is to provide a mechanical-hydraulic control aid for VTOL airplanes in which control impulses are effective upon a control device or the like, but reaction from the control device is ineffective upon the control stick or the like.

Still another object of the invention is to provide such a control aid in which the hydraulic system is locked in a neutral position upon failure of hydraulic pressure so that the control aid may be actuated entirely mechanically for emergency control under such circumstances.

A still further object of the invention is to provide a novel method of controlling a VTOL airplane by manually initiated velocity-dependent input pulses with proportioning of the acceleration-dependent output pulses to correspond to the input pulses.

For an understanding of the principles of the invention, reference is made to the following description of typical embodiments thereof as illustrated in the accompanying drawings.

In the drawings:

FIG. 1 is an elevational view, partly in section and partly diagrammatic, of a control aid embodying the invention and illustrating a reaction lock for the lever chain and a pressure-failure responsive lock for the hydraulic unit;

FIG. 2 is a view, generally similar to FIG. 1, but diagrammatically illustrating the operation of the control aid responsive to an input pulse applied thereto mechanically;

FIG. 3 is a graph in the nature of a travel-time diagram illustrating the qualitative course of a control pulse applied to and derived from the control aid of the invention;

FIG. 4 is a partial sectional view illustrating a preferred embodiment of the hydraulic control unit of the invention utilizing a longitudinally displaceable prismatic baffle;

FIG. 5 is a view similar to FIG. 4 illustrating a baffle in the form of a flexible spring rigidly clamped at its center.

Figure 6:
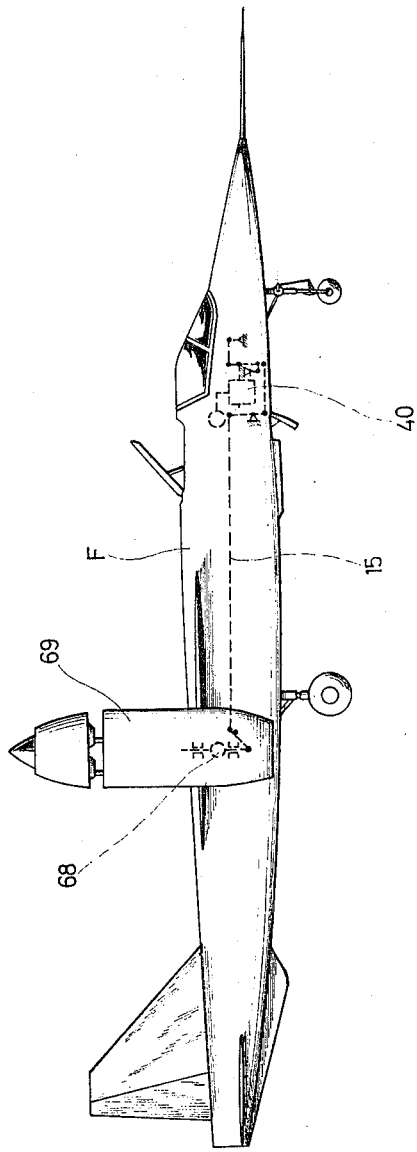
FIG. 6 is a side elevation view of a VTOL aircraft schematically illustrating the incorporation of the control aid of the invention therein.

Referring first to FIG. 1, the control aid embodying the invention comprises a mechanical unit or part and a hydraulic unit or part, which units or parts are intercoupled for conjoint operation. The lever chain or linkage includes a first or input lever 1, a second or output lever 2, and a rod 3 pivotally interconnected to corresponding ends of levers 1 and 2 as at pivots 11 and 12, respectively. First or input lever 1 has a fulcrum 10 which also serves as a coupling point to the output side of the hydraulic unit, described hereinafter. Second or output lever 2 has a fulcrum 13 fixed with respect to a housing 40 for the hydraulic unit. The other end of lever 1 is connected to a link 8, of a control system, at a pivot 9, and the upper end of lever 2 is connected, at a pivot 14, to a link 15 of a control system including a setting member 68 of an engine 69 of a VTOL aircraft F (FIG. 6).

It will be noted that the distance between fulcrum 10 and pivot 9 is substantially less than the distance between pivot 10 and fulcrum 11. Correspondingly, the distance between fulcrum 13 and pivot 12 is very substantially less than the distance between fulcrum 13 and pivot 14. Thus, a control impulse imparted through the lever 8 and having a certain preselected magnitude will result in a movement of link 15 of a greatly amplified magnitude due to the arm ratios of the levers 1 and 2 interconnected by rod 4.

The lever chain comprising the levers 1 and 2 and the interconnecting rod or coupling 13 may be positioned, at the pivot points 9 and 14, in any point in a control system. For example, the input link 8 may lead to a manual control which is operated by the pilot, and the link 15 may be connected to a control device or the like of a propulsion unit governor.

As stated, the hydraulic part or unit of the control aid is arranged in a fixed housing 40, and is designed as a two-part choke-coupled amplifier. The hydraulic unit includes an anticipatory control stage in the form of a baffle 31 operatively associated with identical nozzles 32 and 33. The relative position of baffle 31 with respect to nozzles 32 and 33 is controlled by means of a control rod 30. Nozzles 32 and 33 are connected in communication with working chambers 34 and 35 for a double acting control piston 52. These working chambers are supplied with hydraulic fluid under pressure from a common source 38 through identical feed chokes 36 and 37. The hydraulic fluid from pressure source 38 flows constantly in the direction of a common pressure sink 39, as indicated by the arrows, and hydraulic fluid discharged from nozzles 32 and 33 flows into this common sink 39.

In the zero position of the nozzle-baffle control system as shown in FIG. 1, baffle 31 and control piston 52 are in the center or neutral position and are thus in equilibrium with the pressure medium. Coupling of the hydraulic unit of the control aid with the mechanical unit thereof is effected unilaterally through a coupling linkage designed to provide a speed reduction. Input lever 1 has an articulated coupling point 41 at which there is connected the lower end of a coupling link or rod 42. The upper end of rod 42 is connected, at a pivot 43, to a crank 44 which is pivotal about a fixed fulcrum 45 on a base 55 of housing 40. Fixed fulcrum 13 is also on this base 55. Through an intermediate pivot 46, coupling rod 42 is connected to an articulation link 47 whose opposite end is pivotally connected, at a pivot 48, to control rod 30 connected to baffle 31.

With respect to the output side of the hydraulic unit of the control aid, the left end of piston rod 51 of control piston 52 is connected to a hinge or sleeve 49 concentric with fulcrum 10 of first or input lever 1. Sleeve 49 extends to the left side of piston rod 51 and into an elongated slot or recess 50 in base 55. Base 55 also provides an abutment 56 for fixed fulcrum 13 of the second or output lever 2, and further carries a stop 57 having arms 58 and 59 engageable with a pin 60 in lever 2 at opposite limits of movement of lever 2.

As will be observed in FIG. 1, rod 3 of the lever chain includes a so-called "reaction lock" 4 including a housing 5 which, through an articulation link 6, has an articulated connection to a fixed point. Reaction lock 4 provides for transmission of any movement of input lever 1 to output lever 2 without any hindrance, while preventing transmission of movements of lever 2 back to lever 1. Thereby, reaction forces due to the control device or the like cannot be effective upon the pilot's control stick. As stated, the reaction lock 4 is clearly shown and described in said copending allowed U.S. patent application, Serial No. 293,732.

Base 55 also mounts a lock 20 which becomes automatically effective in the neutral position of control piston 52 in the event of failure of the hydraulic fluid supply. A housing 21 is connected with fluid pressure source 38 through a line 26. Housing 21 contains a piston 23 which is biased toward the locking position by a spring 22 and is provided with a piston nose 24. Piston 23 is subjected to the pressure fluid action beneath the same and thus, when the pressure fluid source is operative, nose 24 is maintained out of locking position by piston 23 being moved upwardly to compress spring 22. Should the pressure fail, piston nose 24 will engage a groove 25 of piston rod 51, when control piston 52 is in the neutral position, and thus lock out the hydraulic system.

The method of operation of the mechanical-hydraulic control aid shown in FIG. 1 will now be described with reference to FIG. 2. When a control or input pulse is applied to the control aid, link 8 of the control linkage rotates first or input lever 1 clockwise about its fulcrum 10 from its neutral position 9–11 to assume a position corresponding to the amount of manual movement of the pilot's control.

Referring to FIG. 3, this control or input pulse is represented by the curve $x$. After a very short delay, lever 1 assumes the position 9'–11' indicated by broken lines, and this position corresponds to the amplitude of movement of the pilot's control. In proportion to the movement of pivot 11 of lever 1 to its new position 11', lever 2 is rotated clockwise by rod 3 about fixed or reference fulcrum 13. Thereby, lever 2 moves from its neutral position 12–14 into the position 12'–14' indicated by broken lines and it will be noted that the amplitude of movement of lever 2 is very substantially greater than the angular movement of lever 1. During this operation, reaction lock 4 in rod 3 acts as a rigid connection. The greater amplitude of movement of point 14 of lever 2 is due to the respective lever arm ratios of levers 1 and 2 with reference to their pivot points 10 and 13, respectively.

This purely mechanical movement due to a velocity-dependent input pulse effected manually by the pilot, for example, has a hydraulic control pulse superposed thereon. As lever 1 changes its angular position, as described, coupling 41, which is on the input side of the hydraulic control unit, has its position changed correspondingly. Thereby, coupling rod 42 is shifted from its neutral position 41–43 into a position 41'–43' as indicated by broken lines. This results in a change of the angular position of crank 44 to the position 44' or 45–43'. Articulation link 47 changes from the neutral position 46–48 to the shifted position 46'–48'. Thus, control rod 30 is moved to the left and outwardly of housing 40 by the distance 48–48', and baffle 31 is thus moved from its neutral position into a position closer to nozzle 32, as also indicated by broken lines. The pressure medium flowing evenly in the neutral or center position of the hydraulic control system and from pressure source 38 through feed chokes 36 and 37, and thence through working chambers 35 and 34 to the nozzles 32 and 33, now has imposed thereon different nozzle outlet resistances due to the change in position of baffle 31 relative to nozzles 32 and 33. The outlet resistance effective on nozzle 33 is reduced, thus resulting in a reduction in pressure in working chamber 35. The pressure in working chamber 34 is correspondingly increased due to the higher outlet resistance effective on nozzle 32. These two different pressures result in movement of control piston 52 in the direction of lower pressure until pressure equilibrium is restored on both sides of control piston 52, in a manner described hereinafter. Thus, control piston 52 travels from its neutral position into the position indicated by broken lines in FIG. 2. Through piston rod 51, this shifts fulcrum 10 of lever 1, with hinge pin 49 being guided in recess 50 of base 55, the shift being to the right of the drawing and the shifted position of fulcrum 10 being indicated at 10''.

If it is assumed that the pilot maintains his control in its new position, wherein member 8 maintains the pivot 9 of lever 1 in position 9', this pivot 9' acts as an additional fixed fulcrum of the lever chain. When fulcrum 10 is displaced by control piston 52 and piston rod 51 into the new position 10'', the lever chain assumes the position 9'–10''–11''–12''–13–14'' indicated by dot and dash lines. The curve "$y$ mech.", representing the output pulse resulting from the initial mechanical displacement of the lever system, is fed back or reduced by superposition or combination with the curve representing the output valve "$y$ hydr." to an output value "$y$," as best seen in FIG. 3. At the same time, the input coupling linkage is brought into a new position 41''–46''–45–48 indicated by the dot and dash lines and broken lines in FIG. 2.

The kinematics of the lever chain and of the coupling linkage is such that pivot 48 returns, during such feed back, to its initial neutral position so that control rod 30 and baffle 31 again assume their neutral or center positions. Thus, equal outlet resistances will again be effective on nozzles 32 and 33 so that the pressure in working chambers 34 and 35 is again equalized. As a result of such pressure equilibrium, control piston 52 comes to rest in the position indicated by broken lines. In this position of the control aid, output value "$y$" of the control pulse is proportional to the input value "$x$" and smaller than the latter as will be observed in FIG. 3.

The time delay of the differentiating feed back provided by the hydraulic unit of the control aid, compared to the lead provided by the mechanical unit of the control aid, as well as the remaining proportional part of the output value of the control pulse, is determined in dependence upon the determinants of the VTOL airplane being controlled, and is particularly adapted to the mass of the control linkage and to the friction forces operating during the control process.

In accordance with the invention, various advantageous improvements may be made in the hydraulic unit of the control aid shown in FIGS. 1 and 2. Referring to FIG. 4, baffle 31 may be constructed so as to be substantially prismatic in a longitudinal direction, with a base 17 and acute angle side faces 18 and 19 forming the control surfaces effective to provide outlet resistances for nozzles 32 and 33. Nozzles 32 and 33 may be provided with adjusting means 64 for adjusting the relative positions thereof. Base 17, due to initially stressed springs 62, is guided without play by a guide 16 along which the baffle is displaceable longitudinally with respect to the two nozzles. To reduce the frictional resistance to as low a value as possible, guide 62 may be provided with rolling bodies 63 engaging base 17 of the baffle. The variation of the choke gap or outlet resistance effective upon the nozzles is provided by means of control rod 30 of the coupling linkage by parallel displacement of the control surfaces 18 and 19 relative to the nozzles 32 and 33. An elastic intermediate member may be provided between the control rod and the baffle. Otherwise, the arrangement and the method of action of this form of baffle-nozzle device correspond to the corresponding arrangement of FIGS. 1 and 2.

In the embodiment of the invention shown in FIG. 5, baffle 31 is designed as a flexible spring and is clamped rigidly at its center at a fixed point 65. Nozzles 32 and 33 are associated with respective free ends of the baffle. Elastic intermediate members 28, 28 may be connected between the baffle and housing 40 to adjust and support the baffle, and thereby the initial bias on the baffle is adjustable so that the lines of action can coincide with the lines of action of nozzles 32 and 33.

In this case, the baffle is actuated by means of a control beam 66 pivoted at a fixed point 67 and having a central arm pivotally connected to control rod 30. The ends of beam 66 are connected with the respective free ends of baffle 31 by means of elastic members 29 whose initial bias is adjusted in the manner of a parallelogram. With the changed position of the control rod, a comparison of forces takes place between the series-connected elastic intermediate members and the parallel-connected elastic intermediate members and the parallel-connected baffle, so that a definable variation of the choke gap is provided. This gap can also be influenced by varying the initial stress of the individual intermediate members, both as to their size and as to their time constants, within a range required for the desired purpose. The arrangement of FIG. 5 otherwise acts in the same manner as that of the corresponding arrangement of FIGS. 1 and 2.

It should be stated that the mechanical-hydraulic control aid returns to the neutral position 9–10–11–12–13–14 shown in FIG. 1, and in solid lines in FIG. 2, by movement of member 8 of the control linkage and in a manner similar to the control action described above. Stop 57 serves as a mechanical limit of the output value y in both directions. When lever 2 is turned about its fixed fulcrum 13, pin 60 of the lever abuts with one of the shoulders 58 or 59 shown in FIG. 1.

Lock 20 for control piston 52 is provided for emergencies and becomes automatically effective only in case of failure of the hydraulic pressure. Under the bias of spring 22, piston 23 then engages the piston nose 24 in groove 25 of piston rod 51 when the pilot has moved control piston 52 to the neutral position. In the event of such failure of hydraulic pressure, the control piston 52 can be displaced without any effective resistance in the working chambers 34 and 35 through the medium of piston rod 51 coupled at 10 with the lever chain, so that the positions of the piston nose 24 and the groove 25 correspond to each other. As long as the working pressure of the hydraulic fluid, indicated by the arrows of FIG. 1, is effective in pressure housing 21, piston 23 is maintained out of engagement against the force of spring 22. The position shown in FIG. 1 corresponds to the position piston 23 occupies when hydraulic pressure of the required value is available in the system.

While specific embodiments of the invention have been shown and described in detail to illustrate the application of the principles of the invention, it will be understood that the invention may be embodied otherwise without departing from such principles.

What is claimed is:

1. A control aid comprising, in combination, a lever chain including an input lever having first and second ends and pivoted, intermediate its ends, at a shiftable first fulcrum, an output lever having first and second ends and pivoted, intermediate its ends, at a fixed second fulcrum, and a link interconnecting the first ends of said levers; whereby, upon application of a velocity-dependent input impulse to the second end of said input lever, the second end of said output lever will be shifted to provide a velocity-dependent output impulse; and a servo system including a control member shifted by pivoting of said input lever about its fulcrum, and an output member connected to the fulcrum of said input lever; said output member, responsive to shifting of said control member by movement of said second end of said input lever, shifting said first fulcrum, about said second end of said input lever as a fixed pivot, to convert the velocity-dependent output impulse of the second end of said output lever into an acceleration-dependent output impulse corresponding to the velocity-dependent input impulse applied to said second end of said first lever.

2. A control aid comprising in combination, an input lever having a first fixed pivot intermediate its ends providing a short arm and a long arm; a shiftable first fulcrum for said first fixed pivot; an output lever having a second fixed pivot intermediate its ends providing a short arm and a long arm; a fixed second fulcrum for said second fixed pivot; a link pivotally interconnecting the end of the long arm of said input lever to the end of the short arm of said output lever whereby, upon application of a velocity-dependent input impulse to the end of the short arm of said input lever, the end of the long arm of said output lever will provide a greatly amplified velocity-dependent output impulse; a servo system including a control member and an output member; linkage connecting said control member to said input lever; means connecting said output member to said shiftable first fulcrum; said servo system, upon movement of said control member responsive to application of a velocity-dependent input impulse to the end of the short arm of said input lever, shifting said shiftable first fulcrum about the end of the short arm of said input lever as a pivot, to shift the end of the long arm of said output lever to convert said velocity-dependent output impulse into an acceleration-dependent output impulse corresponding to said velocity-dependent input impulse.

3. A control aid comprising, in combination, an input lever having a first fixed pivot intermediate its ends providing a short arm and a long arm; a shiftable first fulcrum for said first fixed pivot; an output lever having a second fixed pivot intermediate its ends providing a short arm and a long arm; a fixed second fulcrum for said second fixed pivot; a link pivotally interconnecting the end of the long arm of said input lever to the end of the short arm of said output lever whereby, upon application of a velocity-dependent input impulse to the end of the short arm of said input lever, the end of the long arm of said output lever will provide a greatly amplified velocity-dependent output impulse; a servo system including a control member and an output member; linkage connecting said control member to said input lever; means connecting said output member to said shiftable first fulcrum; said servo system, upon movement of said control member responsive to application of a velocity-dependent input impulse to the end of the short arm of said input lever, shifting said shiftable first fulcrum about the end of the short arm of said input lever as a pivot, to shift the end of the long arm of said output lever to convert said velocity-dependent output impulse into an acceleration-dependent output impulse corresponding to said velocity-dependent impulse; said linkage connecting said control member to said input lever providing a speed reduction for said control member relative to the speed of movement of said input lever.

4. In a thrust jet controlled VTOL airplane, controlled primarily by the acceleration method, a control aid comprising, in combination, a lever chain including an acceleration controlling manually operated first lever, a second lever, and a rod interconnecting said levers and articulated to each thereof, said lever chain, responsive to application of a velocity-dependent input impulse to said first lever, providing an amplified velocity-dependent output impulse from said second lever; a shiftable fulcrum for said first lever; a fixed fulcrum for said second lever; a nozzle-baffle plate fluid pressure servo system including a control member connected to said first lever and an output member connected to the fulcrum of said first lever; said servo system, responsive to shifting of said control member responsive to application of a velocity-dependent input impulse of said first lever, effecting operation of said output member to shift the fulcrum of said first lever to convert the amplified velocity-dependent output impulse of said second lever into an acceleration-dependent output impulse corresponding to said velocity-dependent input impulse.

5. In a thrust jet controlled VTOL airplane, controlled by the acceleration method, a control aid comprising, in combination, a lever chain including a manually operated first lever having a first fixed pivot intermediate its ends providing a short arm and a large arm, an acceleration controlling second lever having a second fixed pivot intermediate its ends providing a long arm and a short arm, a link pivotally connected to the end of the long arm of the first lever and the end of the short arm of the second lever, a shiftable first fulcrum for said first pivot, and a fixed second fulcrum for said second pivot; whereby, upon application of a velocity-dependent impulse to the end of the short arm of said first lever, the end of the long arm of said second lever will provide an amplified velocity-dependent output impulse; and a nozzle-baffle plate fluid pressure servo system including a baffle connected to the long arm of said first lever and an output member connected to said shiftable fulcrum; said servo system, responsive to displacement of said baffle resulting from application of a velocity-dependent input impulse to the end of the short arm of said first lever, operating said output member to shift said shiftable fulcrum to move the end of the long arm of said second lever in a direction to convert the amplified velocity-dependent output impulse into an acceleration-dependent output impulse corresponding to said velocity-dependent input impulse.

6. In a thrust jet controlled VTOL airplane, controlled by the acceleration method, a control aid comprising, in combination, a lever chain including a manually operated first lever having a first fixed pivot intermediate its ends providing a short arm and a long arm, an acceleration controlling second lever having a second fixed pivot intermediate its ends providing a long arm and a short arm, a link pivotally connected to the end of the long arm of the first lever and the end of the short arm of the second lever, a shiftable first fulcrum for said first pivot, and a fixed second fulcrum for said second pivot; whereby, upon application of a velocity-dependent impulse to the end of the short arm of said first lever, the end of the long arm of said second lever will provide an amplified velocity-dependent output impulse; a source of fluid under pressure; a pair of nozzles; a displaceable baffle having a neutral position in which it is spaced equal distances from the outlets of each of said nozzles, and controlling the outlet resistances of said nozzles; a common pressure fluid sink for said nozzles; a cylinder; a double-acting piston in said cylinder, said cylinder providing working chambers on each side of said piston; means commonly connecting said working chambers to said source of pressure fluid; means respectively connecting each nozzle to a respective working chamber; means connecting said piston to said shiftable fulcrum; and means connecting said baffle to the long arm of said first lever; whereby, upon application of a velocity-dependent input impulse to the end of the short arm of said first lever, said baffle will be shifted in a direction to provide a differential pressure on said piston to move said shiftable fulcrum in a direction to move the end of the long arm of said second lever in a direction to convert the amplified velocity-dependent output impulse thereof into a reduced acceleration-dependent output impulse corresponding to said velocity-dependent input impulse.

7. In a thrust jet controlled VTOL airplane, controlled by the acceleration method, a control aid comprising, in combination, a lever chain including a manually operated first lever having a first fixed pivot intermediate its ends providing a short arm and a long arm, an acceleration controlling second lever having a second fixed pivot intermediate its ends providing a long arm and a short arm, a link pivotally connected to the end of the long arm of the first lever and the end of the short arm of the second lever, a shiftable first fulcrum for said first pivot, and a fixed second fulcrum for said second pivot; whereby, upon application of a velocity-dependent impulse to the end of the short arm of said first lever, the end of the long arm of said second lever will provide an amplified velocity-dependent output impulse; a source of fluid under pressure; a pair of nozzles; a displaceable baffle having a neutral position in which it is spaced equal distances from the outlets of each of said nozzles, and controlling the outlet resistances of said nozzles; a common pressure fluid sink for said nozzles; a cylinder; a double-acting piston in said cylinder, said cylinder providing working chambers on each side of said piston; means commonly connecting said working chambers to said source of pressure fluid; means respectively connecting each nozzle to a respective working chamber; means connecting said piston to said shiftable fulcrum; and linkage, including a coupling rod, providing an articulated connection between said baffle and a coupling point on the long arm of said first lever; whereby, upon application of a velocity-dependent input impulse to the end of the short arm of said first lever, said baffle will be shifted in a direction to provide a differential pressure on said piston to move said shiftable fulcrum in a direction to move the end of the long arm of said second lever in a direction to convert the amplified velocity-dependent output impulse thereof into a reduced acceleration-dependent output impulse corresponding to said velocity-dependent input impulse.

8. In a thrust jet controlled VTOL airplane, controlled primarily by the acceleration method, a control aid comprising, in combination, a lever chain effective to convert a velocity-dependent input impulse into a velocity-dependent output impulse, said lever chain including a manually operated input lever, an acceleration controlling output lever, and a link connecting said levers and articulated to corresponding ends thereof; and a nozzle-baffle fluid pressure servo system connected to said lever chain and operable, responsive to an input impulse to the latter to provide a feedback impulse converting the velocity-dependent output impulse to an acceleration-dependent output impulse corresponding to the velocity-dependent input impulse; said servo system including a source of fluid under pressure, a fluid pressure operated output member, a pair of nozzles connected to said source of fluid pressure through said output member and controlling displacement of said output member in accordance with the relative discharge resistance to said nozzles, and a baffle controlling the relative discharge resistances of said nozzles; said baffle being a substantially equal legged, acute angled prism having a relatively elongated base and having its side faces each operatively associated with a respective nozzle, each nozzle discharging substantially perpendicularly to the associated side face and said baffle normally occupying a position in which its side faces are at substantially equal distances from the respective nozzles; guide means extending longitudinally of said base of said baffle for longitudinal displacement of the latter; means connecting said baffle to said input lever for displacement thereby in accordance with the value of the velocity-dependent input impulse applied to said lever chain; and means connecting said output member to said input lever to displace said input lever in accordance with the adjusted position of said baffle to convert the velocity-dependent output signal of said output lever into an acceleration-dependent output signal corresponding to the velocity-dependent input impulse to said input lever.

9. A mechanical-fluid pressure control aid comprising, in combination, an input lever having first and second ends and a fixed pivot intermediate its ends; a shiftable first fulcrum for said first fixed pivot; an output lever having first and second ends and a second fixed pivot intermediate its ends; a fixed second fulcrum for said second fixed pivot; a link interconnecting corresponding first ends of said levers and articulated thereto; a source of fluid under pressure; a fluid pressure actuator including a double acting piston; means connecting said double acting piston to said shiftable first fulcrum; a pair of nozzles connected to said source through said fluid pressure actuator and controlling the pressures on opposite sides of said piston in accordance with the respective discharge resistances of said nozzles; a movable baffle controlling the respective discharge resistances of said nozzle, said baffle being in the form of an equal legged acute angled prism having an elongated base extending in the direction of displacement of said baffle, the side faces of said baffle each being associated with a respective nozzle and the respective nozzle discharging substantially perpendicularly to the associated side face; means connecting said baffle to said input lever; means operable to apply a velocity-dependent input impulse to the second end of said input lever to move the second end of said output lever to provide a velocity-dependent output impulse, said baffle, upon displacement of said input lever, shifting relative to said nozzles to vary the relative discharge resistances thereof in a direction to effect movement of the piston of said actuator to shift said shiftable first fulcrum about the second end of said input lever in a direction to shift the second end of said output lever to convert said velocity-dependent output impulse into an acceleration-dependent output impulse correspondent to said velocity-dependent input impulse.

10. A control aid, as claimed in claim 8, including rolling bodies on said guide means supporting said baffle for substantially frictionless movement; and initially stressed springs connected to said baffle and maintaining the same in engagement with said rolling bodies and without play.

11. In a thrust jet controlled VTOL airplane, controlled by the acceleration method, a control aid comprising, in combination, a lever system for converting a velocity-dependent input impulse into a velocity-dependent output impulse, said lever system including a manually operable input lever having a first fixed pivot intermediate its ends, a shiftable first fulcrum for said first fixed pivot, an acceleration controlling output lever having a second pivot intermediate its ends, a fixed second fulcrum for said second pivot, and a link interconnecting corresponding first ends of said input and output levers and articulated thereto; a nozzle-baffle fluid pressure servo system connected to said lever chain and effective, responsive to an input impulse to the latter, to provide a feedback impulse converting the velocity-dependent output impulse to an acceleration-dependent output impulse corresponding to the velocity-dependent input impulse; said servo system including a source of fluid under pressure, a fluid pressure actuator connected to said source and including a double acting piston connected to said first shiftable fulcrum, a pair of nozzles connected to said source through said fluid pressure actuator on responsive opposite sides of said double acting piston and controlling displacement of said piston in accordance with the discharge resistances of said nozzles, and a baffle controlling the relative discharge resistances of said nozzles; said baffle comprising a flexible spring fixedly clamped at a point therealong and normally at equal distances from each of said nozzles; means connecting said baffle to said input lever to displace said baffle upon displacement of said input lever, to increase the discharge resistance of one nozzle and correspondingly decrease the discharge resistance of the other nozzle to correspondingly change the fluid pressure acting on opposite sides of said piston; and means for applying a velocity-dependent input impulse to a second end of said input lever to provide a velocity-dependent output impulse from the second end of said output lever; said piston, responsive to the resulting displacement of said baffle, shifting said shiftable first fulcrum to pivot said input lever about said second end thereof to shift the second end of said output lever to convert said velocity-dependent output impulse into an acceleration-dependent output impulse corresponding to the velocity-dependent input impulse.

12. A control aid, as claimed in claim 5, including elastic intermediate members interposed between said baffle and said input lever.

13. A control aid, as claimed in claim 5, including a housing enclosing said servo motor; and elastic intermediate members interposed between said baffle and fixed points of said housing.

14. A control aid, as claimed in claim 5, in which said nozzles are adjustable relative to said baffle.

15. A control aid, as claimed in claim 11, including a housing enclosing said servo motor; elastic intermediate members interposed between said baffle and fixed points on said housing; and means for adjusting the tension of said elastic members.

16. In a thrust jet controlled VTOL airplane, controlled by the acceleration method, a control aid comprising, in combination, a lever chain including a manually operable first lever having a first fixed pivot intermediate its ends providing a short arm and a long arm, an acceleration controlling second lever having a second fixed pivot intermediate its ends providing a long arm and a short arm, a link pivotally connected to the end of the long arm of the first lever and the end of the short arm of the second lever, a shiftable first fulcrum for said first pivot, and a fixed second fulcrum for said second pivot; whereby, upon application of a velocity-dependent impulse to the end of the short arm of said first lever, the end of the long arm of said second lever will provide an amplified velocity-dependent output impulse; a source of fluid under pressure; a pair of nozzles; a displaceable baffle having a neutral position in which it is spaced equal distances from the outlets of each of said nozzles, and controlling the outlet resistances of said nozzles; a common pressure fluid sink for said nozzles; a cylinder; a double-acting piston in said cylinder, said cylinder providing working chambers on each side of said piston; means commonly connecting said working chambers to said source of pressure fluid; means respectively connecting each nozzle to a respective working chamber; means connecting said piston to said shiftable fulcrum; a reaction and feedback lock incorporated in said link and effective to prevent reaction forces on said output lever from being transmitted to said input lever while providing for positive displacement of said output lever upon displacement of said input lever; and an articulated support connecting said reaction and feedback lock to a fixed reference point.

17. In a thrust jet controlled VTOL airplane, controlled by the acceleration method, a control aid comprising, in combination, a lever chain including a manually operable first lever having a first fixed pivot intermediate its ends providing a short arm and a long arm, an acceleration controlling second lever having a second fixed pivot intermediate its ends providing a long arm and a short arm, a link pivotally connected to the end of the long arm of the first lever and the end of the short arm of the second lever, a shiftable first fulcrum for said first pivot, and a fixed second fulcrum for said second pivot; whereby, upon application of a velocity-dependent impulse to the end of the short arm of said first lever, the end of the long arm of said second lever will provide an amplified velocity-dependent output impulse; a source of fluid under pressure; a pair of nozzles; a displaceable baffle having a neutral position in which it is spaced equal distances from the outlets of each of said nozzles, and controlling the outlet resistances of said nozzles; a common pressure fluid sink for said nozzles; a cylinder; a double-acting piston in said cylinder, said cylinder providing working chambers on each side of said piston; means commonly connecting said working chambers to said source of pressure fluid; means respectively connecting each nozzle to a respective working chamber; means connecting said piston to said shiftable fulcrum; a spring biased lock normally biased into locking engagement with the piston rod of said piston when the piston is in a neutral position; and means connecting said lock to said source of fluid under pressure and effective, responsive to a predetermined pressure of said source, to maintain said lock disengaged in opposition to the spring bias thereof; said lock, upon reduction of the pressure of said source below such predetermined value, engaging the piston rod of said piston when the latter is in a neutral position to lock said piston against movement.

18. In a thrust jet controlled VTOL aircraft having an engine regulator and setting member for the regulator, and which aircraft, during the take-off, landing and transition phases, is controlled exclusively as a function of acceleration, a control aid providing the pilot, during these phases, with the feel of a velocity-dependent control, said control aid comprising, in combination, a lever chain including a first lever pivoted intermediate its ends at a first adjustable fulcrum and manually operable by the pilot through a control stick, a second lever pivoted at a fixed fulcrum and connected to said setting member, and a rod articulated to both levers and interconnecting the same; the parameters of said lever chain providing an amplified movement of said setting member responsive to movement of said lever; a nozzle-baffle plate fluid pressure control system connected to a source of fluid under pressure and including a fluid pressure operated movable element; means connecting said first lever to the baffle of said control system for conjoint movement of said first lever and said baffle; and means connecting said first adjustable fulcrum to said movable element of said control system; whereby operation of said first lever imparts a velocity dependent control movement to said setting member and initiates operation of said fluid pressure control system to move said movable element thereof to adjust the fulcrum of said first lever to convert the velocity dependent movement of said setting member into an acceleration-dependent movement thereof.

References Cited by the Examiner

UNITED STATES PATENTS

| | | | |
|---|---|---|---|
| 1,154,062 | 9/1915 | Samuelson | 91—384 X |
| 2,424,901 | 7/1947 | Richolt | 91—369 |
| 2,605,615 | 8/1952 | Meredith | 91—384 X |
| 2,613,890 | 10/1952 | Beman | 91—369 |
| 2,750,928 | 6/1956 | Conway | 91—369 |
| 2,942,581 | 6/1960 | Gaffney | 91—51 X |
| 3,011,482 | 12/1961 | Elmer | 91—391 X |
| 3,122,972 | 3/1964 | Rasmussen | 91—384 X |

FOREIGN PATENTS

| | | |
|---|---|---|
| 188,680 | 12/1922 | Great Britain. |
| 957,900 | 5/1964 | Great Britain. |

MARTIN P. SCHWADRON, *Primary Examiner.*

SAMUEL LEVINE, *Examiner.*

P. T. CORBIN, *Assistant Examiner.*